(12) United States Patent
Woodhouse et al.

(10) Patent No.: US 11,434,021 B2
(45) Date of Patent: Sep. 6, 2022

(54) ELECTRICAL POWER GENERATION ON A VEHICLE

(71) Applicant: BAE Systems plc, London (GB)

(72) Inventors: Gordon Charles Woodhouse, Preston (GB); Graham Andrew Holland, Preston (GB)

(73) Assignee: BAE Systems plc, London (GB)

( * ) Notice: Subject to any disclaimer, the term of this patent is extended or adjusted under 35 U.S.C. 154(b) by 127 days.

(21) Appl. No.: 16/493,811

(22) PCT Filed: Mar. 13, 2018

(86) PCT No.: PCT/GB2018/050637
§ 371 (c)(1),
(2) Date: Sep. 13, 2019

(87) PCT Pub. No.: WO2018/172737
PCT Pub. Date: Sep. 27, 2018

(65) Prior Publication Data
US 2020/0130859 A1    Apr. 30, 2020

(30) Foreign Application Priority Data

Mar. 23, 2017 (EP) ................................. 17250001
Mar. 23, 2017 (GB) ................................. 1704824

(51) Int. Cl.
*H01M 8/04082* (2016.01)
*H01M 8/04119* (2016.01)
*H01M 8/0612* (2016.01)
*H01M 8/0668* (2016.01)
*B64D 41/00* (2006.01)

(52) U.S. Cl.
CPC ........ *B64D 41/00* (2013.01); *H01M 8/04156* (2013.01); *H01M 8/04201* (2013.01); *H01M 8/0618* (2013.01); *H01M 8/0668* (2013.01); *B64D 2041/005* (2013.01); *H01M 2250/20* (2013.01)

(58) Field of Classification Search
CPC ............. B64D 41/00; B64D 2041/005; H01M 8/04156; H01M 8/04201; H01M 8/0618; H01M 8/0668; H01M 2250/20; H01M 8/0612; Y02E 60/50; Y02T 50/40; Y02T 90/40
See application file for complete search history.

(56) References Cited

U.S. PATENT DOCUMENTS

| | | | |
|---|---|---|---|
| 6,502,533 B1 | 1/2003 | Meacham | |
| 6,609,582 B1* | 8/2003 | Botti | B60K 6/46 180/65.245 |
| 7,767,359 B2 | 8/2010 | Hoffjann | |
| 7,815,148 B2 | 10/2010 | Kwok | |
| 2002/0092916 A1* | 7/2002 | Gaarder | B60H 3/022 237/12.3 R |
| 2003/0026747 A1 | 2/2003 | Zhu et al. | |
| 2003/0056429 A1 | 3/2003 | Saitou et al. | |
| 2003/0154654 A1 | 8/2003 | Goebel | |
| 2005/0227129 A1 | 10/2005 | Iio | |
| 2008/0107934 A1 | 5/2008 | Han et al. | |
| 2010/0116363 A1* | 5/2010 | Na | F16K 17/34 137/494 |
| 2010/0174470 A1* | 7/2010 | Bromberg | F02B 17/00 701/103 |
| 2013/0189594 A1* | 7/2013 | Breit | H01M 8/04164 429/410 |
| 2013/0200216 A1 | 8/2013 | Mock et al. | |
| 2014/0212775 A1 | 7/2014 | Fujihara et al. | |
| 2016/0257564 A1 | 9/2016 | Al-Muhaish | |
| 2016/0280541 A1* | 9/2016 | Finnerty | B01J 23/26 |
| 2016/0365590 A1* | 12/2016 | Zheng | H01M 8/06 |
| 2016/0372765 A1* | 12/2016 | Jones | H01M 8/0267 |
| 2016/0380280 A1* | 12/2016 | Filangi | H01M 8/04044 429/429 |
| 2018/0138529 A1* | 5/2018 | Wynne | H01M 8/04231 |
| 2018/0273195 A1* | 9/2018 | Woodhouse | G05D 1/105 |

FOREIGN PATENT DOCUMENTS

| | | |
|---|---|---|
| EP | 1226343 A1 | 7/2002 |
| EP | 1344270 B1 | 9/2003 |
| EP | 2172420 A1 | 4/2010 |
| WO | 0177260 A1 | 10/2001 |
| WO | 0204346 A1 | 1/2002 |
| WO | 2006115657 A2 | 11/2006 |
| WO | 20110122579 A1 | 10/2011 |
| WO | 2017004777 A1 | 1/2017 |

OTHER PUBLICATIONS

Office Action for U.S. Appl. No. 16/493,812 dated Mar. 31, 2022, 36 Pages.
International Preliminary Report on Patentability and Written Opinion for Appl No. PCT/GB2018/050637 dated Sep. 24, 2019, 8 pages.
PCT Search Report and Written Opinion for Appl No. PCT/GB2018/050637 dated Apr. 27, 2018, 12 pages.
Great Britain Search Report for Appl No. GB1704824.0 dated Nov. 9, 2017, 7 pages.

(Continued)

*Primary Examiner* — Muhammad S Siddiquee
(74) *Attorney, Agent, or Firm* — Maine Cernota & Rardin

(57) ABSTRACT

A vehicle comprising: a fuel store (104) configured to store a fuel, the fuel comprising a hydrocarbon; a fuel reformer (108) coupled to the fuel store (104) and configured to: receive an input comprising the hydrocarbon; and process the received input to produce an output comprising hydrogen; and a fuel cell (112) coupled to the fuel reformer (108) and configured to: receive the hydrogen from the fuel reformer (108); and produce, using the received hydrogen, electricity for use on the vehicle.

11 Claims, 2 Drawing Sheets

(56) References Cited

OTHER PUBLICATIONS

Extended European Search Report for Appl No. EP17250001.9 dated Aug. 3, 2017, 7 pages.
PCT Search Report and Written Opinion for Appl No. PCT/GB2018/050633 dated May 31, 2018, 12 pages.
Great Britain Search Report and Written Opinion for Appl No. GB1704819.0 dated Nov. 9, 2017, 54 pages.
Extended European Search Report for Appl No. EP17250003.5 dated Jul. 26, 2017, 7 pages.
International Preliminary Report on Patenability for Appl No. PCT/GB2018/050633 dated Sep. 24, 2019, 8 pages.

* cited by examiner

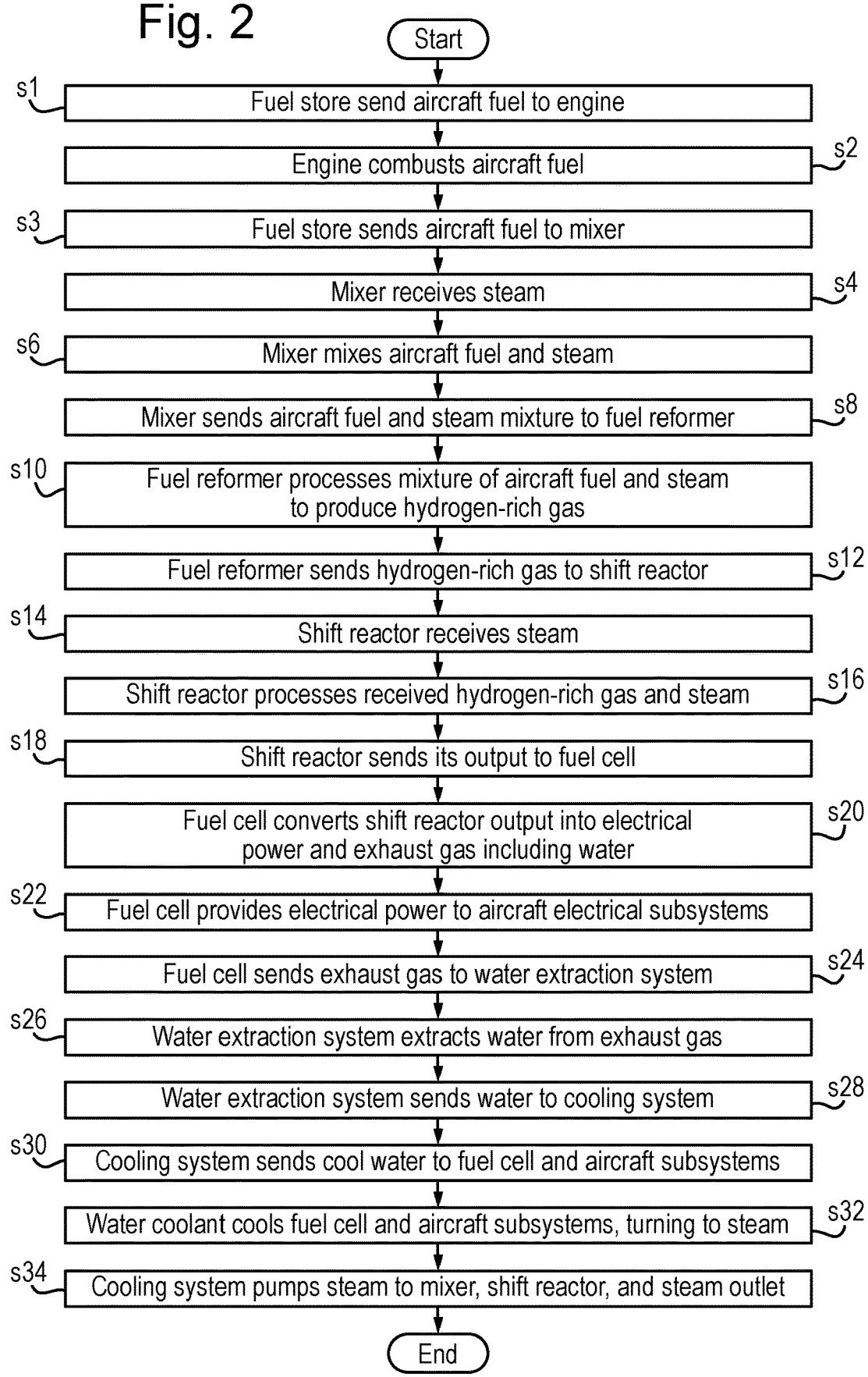

ELECTRICAL POWER GENERATION ON A VEHICLE

RELATED APPLICATIONS

This application is a national phase application filed under 35 USC § 371 of PCT Application No. PCT/GB2018/050637 with an International filing date of Mar. 13, 2018 which claims priority of GB Patent Application 1704824.0 filed Mar. 23, 2017 and EP Patent Application 17250001.9 filed Mar. 23, 2017. Each of these applications is herein incorporated by reference in its entirety for all purposes.

FIELD OF THE INVENTION

The present invention relates to the generation of electrical power on board a vehicle.

BACKGROUND

Many aircraft comprise an aircraft electrical system. Typically, an aircraft electrical system comprises a self-contained network of components that generate, distribute, utilise and store electrical energy. The components of aircraft electrical systems that generate electrical power are generally driven by an engine of the aircraft. The use of fuel cells on aircraft for providing electrical energy is known.

In a separate field to the field of electrical power generation, cooling systems on aircraft are known. For example, an aircraft may include a cooling air cycle and/or a vapour cycle refrigerant system. A vapour cycle refrigerant system utilises a liquid to provide cooling at various loads on the aircraft.

SUMMARY OF THE INVENTION

In a first aspect, the present invention provides a vehicle comprising: a fuel store configured to store a fuel, the fuel comprising a hydrocarbon; a fuel reformer coupled to the fuel store and configured to receive an input comprising the hydrocarbon, and process the received input to produce an output comprising hydrogen; and a fuel cell coupled to the fuel reformer and configured to receive the hydrogen from the fuel reformer, and produce, using the received hydrogen, electricity for use on the vehicle.

The fuel reformer may be an electrically driven fuel reformer powered by the electricity produced by the fuel cell.

The vehicle may further comprise an engine coupled to the fuel store, wherein the engine is configured to combust the fuel to generate thrust for the vehicle.

The vehicle may be an aircraft. The fuel may be an aviation fuel. The fuel may comprise $C_{6-16}$ hydrocarbons. The fuel may comprise kerosene and/or naphtha.

The vehicle may further comprise a mixer configured to: receive the fuel from the fuel store; receive steam; mix the received fuel and the received steam, thereby to produce a mixture; and provide the mixture to the fuel reformer as the fuel reformer input.

The vehicle may further comprise: a shift reactor configured to receive the output of the fuel reformer; receive steam; process the received output of the fuel reformer and the received steam, thereby to produce an output of the shift reactor, wherein a hydrogen content of the output of the shift reactor is greater than a hydrogen content of the output of the fuel reformer; and provide the output of the shift reactor to the fuel cell. The shift reactor may be a water-gas shift reactor.

The vehicle may further comprise a cooling system configured to provide water as a coolant to one or more entities on the vehicle, thereby to provide cooling to the one or more entities, wherein the steam is produced by evaporation of the water during the cooling.

The vehicle may further comprise a carbon monoxide reduction module configured to: receive the output of the fuel reformer; reduce a carbon monoxide content of the received output of the fuel reformer, thereby to produce an output of the carbon monoxide reduction module; and provide the output of the carbon monoxide reduction module to the fuel cell.

The fuel cell may be further configured to produce, as a result of producing the electricity, a fuel cell output comprising water, and output the water for use by one or more entities on the vehicle, the one or more entities being remote from the fuel cell.

The vehicle may further comprise a water extractor configured to: receive the fuel cell output; extract the water from the fuel cell output; and provide the extracted water to the one or more entities remote from the fuel cell.

The vehicle may further comprise a cooling system configured to receive the water produced by the fuel cell, and provide, to one or more vehicle subsystems on the vehicle, the water as a coolant, thereby to cool the one or more vehicle subsystems. The cooling system may be configured to provide the water as a coolant to the fuel cell, thereby cooling the fuel cell.

The fuel reformer may be a fuel reformer selected from the group of fuel reformers consisting of a plasma fuel reformer and a plasmatron fuel reformer.

In a further aspect, the present invention provides a method of generating electricity on a vehicle. The method comprises: storing, by a fuel store on the vehicle, a fuel comprising a hydrocarbon; receiving, by a fuel reformer on the vehicle, an input comprising the hydrocarbon; processing, by the fuel reformer, the received input to produce an output comprising hydrogen; receiving, by a fuel cell on the vehicle, the hydrogen output by the fuel reformer; and producing, by the fuel cell, using the received hydrogen, electricity for use on the vehicle.

BRIEF DESCRIPTION OF THE DRAWINGS

FIG. 2 is a process flow chart showing certain steps of a method performed by the aircraft.

DETAILED DESCRIPTION

Figure 1:
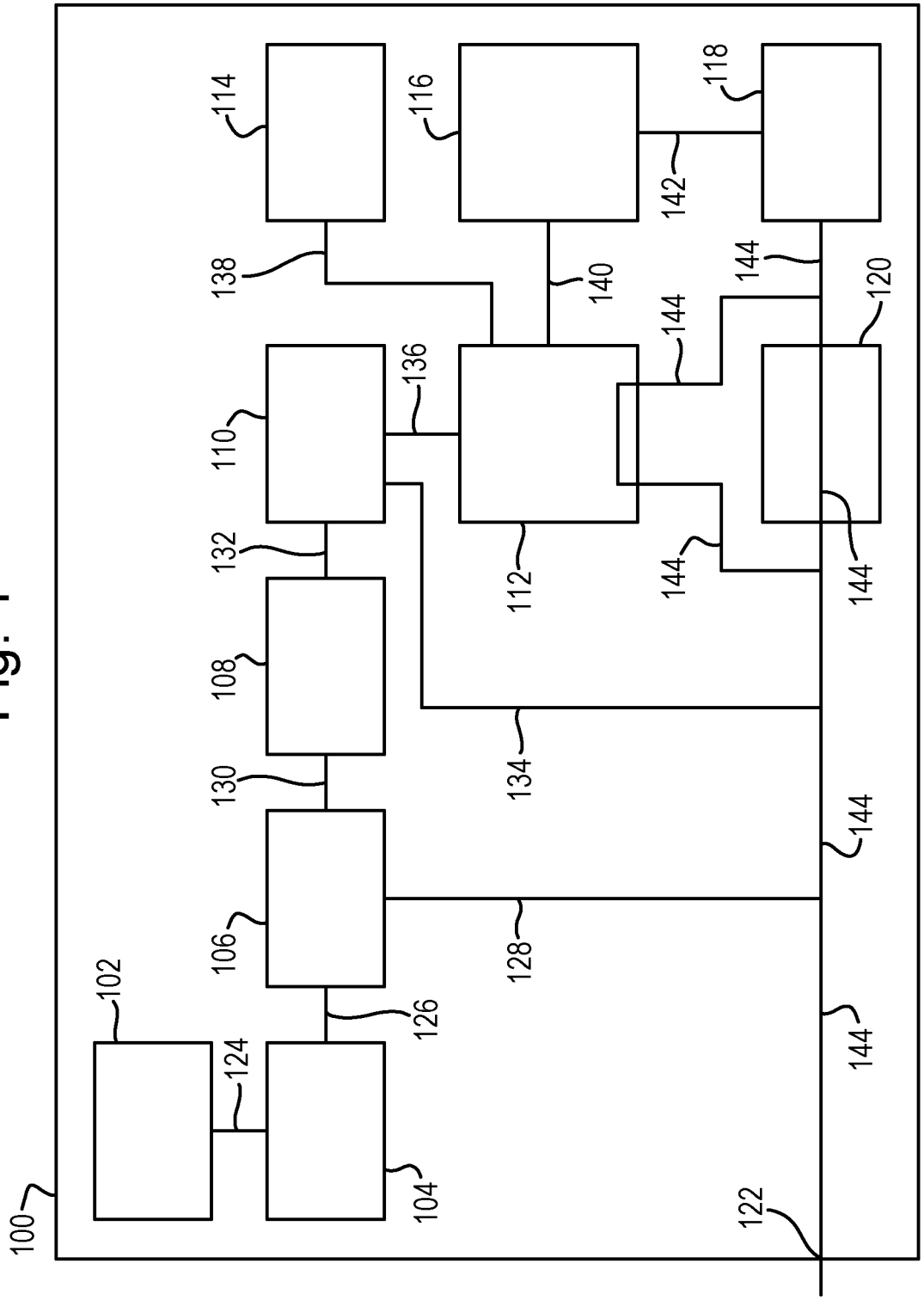
FIG. 1 is a schematic illustration of an example aircraft.

FIG. 1 is a schematic illustration of an example aircraft 100 in which an embodiment of an electrical power generation and cooling system is implemented.

In this embodiment, the aircraft 100 is a manned aircraft.

The aircraft 100 comprises an engine 102, a fuel store 104, a mixer 106, a fuel reformer 108, a shift reactor 110, a fuel cell 112, electrical subsystems 114, a water extraction system 116, a cooling system 118, aircraft subsystems 120, and a steam outlet 122.

In this embodiment, the engine 102 is a gas turbine engine configured to combust aircraft fuel (i.e. aviation fuel) to provide thrust for the aircraft 100. The engine 102 comprises an inlet. The inlet of the engine 102 is coupled to the fuel store 104 via a first conduit 124. The first conduit 124 is a fuel supply line. The engine 102 further comprises an outlet (not shown) via which waste gases are expelled from an exhaust of the aircraft 100.

In this embodiment, the engine 102 does not generate any electrical power on the aircraft 100. In other words, no electrical power is generated on the aircraft using a mechanical or pneumatic offtake from the gas turbine engine. For example, a mechanical output of the engine 102 is not used (e.g. by a conventional gearbox driven system) to generate electricity on the aircraft 100. Also for example, the exhaust gases from the engine 102 do not drive an electrical power generation system. In this embodiment, the aircraft 100 does not include any engine driven electrical power generation systems.

In this embodiment, the fuel store 104 comprises one or more fuel tanks for storing aircraft fuel. The fuel store 104 may further comprise monitoring systems, such as fuel level, temperature and/or pressure sensors. The fuel store 104 may further comprise fuel distribution systems, such as fuel pumps and supply lines. The fuel store 104 comprises a first outlet and a second outlet. As described in more detail later below with reference to FIG. 2, the fuel store 104 is configured to output aircraft fuel from its first and second outlets. The first outlet of the fuel store 104 is coupled to the engine 102 via the first conduit 124. The second outlet of the fuel store 104 is coupled to the mixer 106 via a second conduit 126. The second conduit 126 is a fuel supply line.

In this embodiment, the aircraft fuel stored and distributed by the fuel store 104 is jet fuel comprising kerosene and/or naphtha (e.g. Jet A, Jet A-1, or Jet B).

In this embodiment, the mixer 106 comprises a first inlet, a second inlet, and an outlet. The first inlet of the mixer 106 is coupled to the second conduit 126. The second inlet of the mixer 106 is coupled to a third conduit 128. The third conduit 128 is a pipe or tube. As described in more detail later below with reference to FIG. 2, the mixer 106 is configured to mix fluids received at its first and second inlets to form a mixture, and to output the mixture from its outlet. The outlet of the mixer 106 is coupled to a fourth conduit 130. The fourth conduit 130 is a pipe or tube.

In this embodiment, the fuel reformer 108 is a plasma fuel reformer. The fuel reformer 108 comprises an inlet and an outlet. The inlet of the fuel reformer 108 is coupled to the fourth conduit 130. As described in more detail later below with reference to FIG. 2, the fuel reformer 108 is configured to process fluid received at its inlet, and to output processed fluid from its outlet. The outlet of the fuel reformer 108 is coupled to a fifth conduit 132. The fifth conduit 132 is a pipe or tube.

In this embodiment, the shift reactor 110 is a water-gas shift reactor. The shift reactor 110 comprises a first inlet, a second inlet, and an outlet. The first inlet of the shift reactor 110 is coupled to the fifth conduit 132. The second inlet of the shift reactor 110 is coupled to a sixth conduit 134. The sixth conduit 134 is a pipe or tube. As described in more detail later below with reference to FIG. 2, the shift reactor 110 is configured to perform a water-gas shift reaction using fluids received at its first and second inlets, and to output the resulting fluid from its outlet. The outlet of the shift reactor 110 is coupled to a seventh conduit 136. The seventh conduit 136 is a pipe or tube.

In this embodiment, the fuel cell 112 is a Proton Exchange Membrane (PEM) fuel cell. The fuel cell 112 comprises a fluid inlet, a fluid outlet, and an electrical outlet. The fluid inlet of the fuel cell 112 is coupled to the seventh conduit 136. As described in more detail later below with reference to FIG. 2, the fuel cell 112 is configured to generate electricity using hydrogen fuel received at its fluid inlet, and to output the generated electricity at its electrical outlet. The electrical outlet of the fuel cell is coupled to an electrical connection 138. The fuel cell 112 is further configured to output, at the fluid outlet of the fuel cell 112, fluids produced as a result of generating electricity (e.g. by-products of the electricity generation). The fluid outlet of the fuel cell 112 is coupled to an eighth conduit 140. The eighth conduit 140 is a pipe or tube.

In this embodiment, all electrical power generation on the aircraft 100 is performed by the fuel cell 112. The fuel cell 112 satisfies all electrical demand on the aircraft 100 by the electrical subsystems 114.

In this embodiment, the electrical subsystems 114 are aircraft subsystems that consume electrical power, i.e. electrical loads. The electrical subsystems 114 may include, but are not limited to, a mission system, a navigation system, an avionics system, a fuel system, and an environmental control system. The electrical subsystems 114 are electrically coupled to the electrical connection 138. The electrical subsystems 114 may include some or all of the aircraft subsystems 120.

In this embodiment, the water extraction system 116 (i.e. a water extractor) may be any appropriate water extraction system, including but not limited to a steam cleaning system, a steam cooling system, a turbine water extractor, or a coalescer-based water extractor. The water extraction system 116 comprises an inlet and an outlet. The inlet of the water extraction system 116 is coupled to the eighth conduit 140. As described in more detail later below with reference to FIG. 2, the water extraction system 116 is configured to extract water from fluid received at its inlet, and to output extracted water from its outlet. The outlet of the water extraction system 116 is coupled to a ninth conduit 142. The ninth conduit 142 is a pipe or tube. In this embodiment, the water extraction system 116 further comprises a further outlet (not shown in the Figures) for exhaust gases from which the water has been extracted. These exhaust gasses may be expelled from the aircraft.

In this embodiment, the cooling system 118 is an evaporative cooling system that uses water as a coolant, i.e. a water-based cooling system. The cooling system 118 comprises an inlet and an outlet. The inlet of the cooling system 118 is coupled to the ninth conduit 142. The outlet of the cooling system 118 is coupled to a tenth conduit 144. The tenth conduit 144 comprises pipes or tubes. In this embodiment, the tenth conduit 144 defines two fluid flow paths, in particular a first fluid flow path which travels through or proximate to the fuel cell 112, and a second fluid flow path which travels through or proximate to the aircraft subsystems 120. As described in more detail later below with reference to FIG. 2, the cooling system 118 is configured to receive relatively cool water at its inlet, and pump that relatively cool water out of its output along the tenth conduit 144, thereby to provide cooling to the fuel cell 144 and the aircraft subsystems 120. Thus, in this embodiment the cooling system 118 is a pump configured to pump coolant water to other aircraft systems. In some embodiments, the cooling system 118 comprises means for reducing the temperature of the coolant water prior to that coolant water being pumped by the coolant system 118 to other aircraft systems, for example one or more heat exchangers arranged to transfer heat from the coolant water.

In this embodiment, the aircraft subsystems 120 are aircraft subsystems that generate heat in operation. The aircraft subsystems 120 may benefit from cooling. The aircraft subsystems 120 may include, but are not limited to, an environmental control system. The aircraft subsystems 120 may include some or all of the electrical subsystems 114.

In this embodiment, the tenth conduit 144 extends from the cooling system 118, and then separates into a first branch and a second branch which pass through or proximate to the fuel cell 112 and the aircraft subsystems 120 respectively. After passing through the or proximate to the fuel cell 112 and the aircraft subsystems 120 respectively, the first and second branches of the tenth conduit 144 join together, and then extend to the steam outlet 122. The third conduit 128 and sixth conduit 134 are each coupled to the tenth conduit 144 between the steam outlet 122 and the section at which the first and second branches of the tenth conduit 144 join together.

In this embodiment, the steam outlet 122 is an opening at an external surface of the aircraft 100 from which fluid (e.g. steam) can be expelled.

Apparatus for controlling the above arrangement, and controlling performance of the method steps described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

FIG. 2 is a process flow chart showing certain steps of an embodiment of a method of operation of the electrical power generation and cooling system.

It should be noted that certain of the process steps depicted in the flowchart of FIG. 2 and described below may be omitted or such process steps may be performed in differing order to that presented above and shown in FIG. 2. Furthermore, although all the process steps have, for convenience and ease of understanding, been depicted as discrete temporally-sequential steps, nevertheless some of the process steps may in fact be performed simultaneously or at least overlapping to some extent temporally.

At step s1, the fuel store 104 pumps aircraft fuel stored therein to the engine 102. The aircraft fuel is sent from the fuel store 104 to the engine 102 via the first conduit 124.

At step s2, the engine 102 combusts the aircraft fuel received from the fuel store 104 to generate thrust for the aircraft 100. In this embodiment, waste gases from the combustion process performed by the engine 102 are expelled from the aircraft 100 via an aircraft exhaust.

At step s3, the fuel store 104 pumps aircraft fuel stored therein to the mixer 106. The aircraft fuel is sent from the fuel store 104 to the mixer 106 via the second conduit 126. The mixer 106 receives the aircraft fuel at its first inlet.

A temperature of the aircraft fuel received by the mixer 106 may be dependent on environmental conditions in which the aircraft 100 is operating. Typically, the aircraft fuel is received by the mixer 106 in liquid form, having a temperature in the range of about −40° C. to about 70° C.

At step s4, the mixer 106 receives steam at its second inlet from the third conduit 128.

In this embodiment, the steam received by the mixer 106 via the third conduit 128 is steam that results from water being used to cool the fuel cell 112 and/or the aircraft subsystems 120 (as described in more detail later below at step s32) and which is pumped to the mixer 106, by the cooling system 118 via the tenth conduit 144 and the third conduit 128 (as described in more detail later below at step s34).

In this embodiment, the steam received by the mixer 106 at step s4 has a temperature of at least about 100° C. (at standard pressure, i.e. at nominal conditions in the atmosphere at sea level). In some embodiments, this steam may have a different temperature. For example, in some embodiments (e.g. embodiments in which the aircraft is operating at high altitude, i.e. relatively low pressure compared to atmospheric pressure at sea level), this steam may have a temperature of less than about 100° C., e.g. between 90° C. and less than 100° C., or between 80° C. and 90° C., or between 70° C. and 80° C., or less than 70° C. Also, in some embodiments, this steam may have a temperature of more than about 100° C., e.g. more than 110° C., more than 120° C., more than 130° C., more than 140° C., or more than 150° C.

At step s6, the mixer 106 mixes together the received aircraft fuel and steam, thereby vaporising the aircraft fuel.

Vaporisation of the aircraft fuel, i.e. converting the aircraft fuel into gaseous form, advantageously tends to facilitate fuel reforming by the fuel reformer 108.

At step s8, the mixer 106 sends the gaseous mixture of aircraft fuel and steam to the fuel reformer 108 via the fourth conduit 130. The fuel reformer 108 receives the gaseous mixture of aircraft fuel and steam at its inlet.

At step s10, the fuel reformer 108 processes the received gaseous mixture of aircraft fuel and steam to produce hydrogen.

In particular, in this embodiment, the fuel reformer 108 creates a continuous plasma in a chamber. This chamber is then filled with the gaseous aircraft fuel (which in this embodiment comprises kerosene vapour) and air, whereby the aircraft fuel dissociates to create a hydrogen-rich gas. This hydrogen-rich gas comprises hydrogen gas and carbon monoxide. The hydrogen-rich gas may comprise approximately 20% hydrogen gas (for example, about 18, 19, 20, 21 or 22% hydrogen). The hydrogen-rich gas may comprise approximately 20% carbon monoxide (for example, about 18, 19, 20, 21 or 22% carbon monoxide). The hydrogen-rich gas may include other gaseous products, for example carbon dioxide and nitrogen gas.

At step s12, the fuel reformer 108 sends the hydrogen-rich gas to the shift reactor 110 via the fifth conduit 132. The shift reactor 110 receives the hydrogen-rich gas at its first inlet.

At step s14, the shift reactor 110 receives steam at its second inlet from the sixth conduit 134.

In this embodiment, the steam received by the shift reactor 110 via the sixth conduit 134 is steam that results from water being used to cool the fuel cell 112 and/or the aircraft subsystems 120 (as described in more detail later below at step s32) and which is pumped to the shift reactor 110, by the cooling system 144, via the tenth conduit 144 and the sixth conduit 134 (as described in more detail later below at step s34).

In this embodiment, the steam received by the shift reactor 110 at step s14 has a temperature of at least about 100° C. (at standard pressure, i.e. at nominal conditions in the atmosphere at sea level). In some embodiments, this steam may have a different temperature. For example, in some embodiments (e.g. embodiments in which the aircraft is operating at high altitude, i.e. relatively low pressure compared to atmospheric pressure at sea level), this steam may have a temperature of less than about 100° C., e.g. between 90° C. and less than 100° C., or between 80° C. and 90° C., or between 70° C. and 80° C., or less than 70° C. Also, in some embodiments, this steam may have a temperature of more than about 100° C., e.g. more than 110° C., more than 120° C., more than 130° C., more than 140° C., or more than 150° C.

At step s16, the shift reactor 110 processes the received hydrogen-rich gas and steam so as to effect a water-gas shift reaction.

In particular, in this embodiment, the shift reactor 110 causes the carbon monoxide present in the received hydrogen-rich gas to react with the received steam (i.e. water vapour) to form carbon dioxide and hydrogen gas. Thus, advantageously, the proportion of hydrogen in the hydrogen-rich gas tends to be increased, while the proportion of carbon monoxide in the hydrogen-rich gas tends to be decreased. For example, the proportion of hydrogen gas in the hydrogen-rich gas may be increased to be more than about 20%, e.g. at least 21%, at least 22%, at least 23%, at least 24%, at least 25%, at least 26%, at least 27%, at least 28%, at least 29%, at least 30%, at least 35%, or at least 40%. Also, for example, the proportion of carbon monoxide in the hydrogen-rich gas may be decreased to be less than about 20%, e.g. at most 19%, at most 18%, at most 17%, at most 16%, at most 15%, at most 14%, at most 13%, at most 12%, at most 11%, at most 10%, at most 5%, at most 3%, at most 2%, or at most 1%.

At step s18, the shift reactor 110 sends its gaseous output (i.e. the hydrogen-rich having increased hydrogen gas content as a result of undergoing the water-gas shift reaction) to the fuel cell 112 via the seventh conduit 136. The fuel cell 112 receives the hydrogen-rich gas at its inlet.

At step s20, the fuel cell 112 converts the hydrogen gas (comprised in the received hydrogen-rich gas) into direct current (DC) electricity through a chemical reaction of positively charged hydrogen ions with oxygen from a received air supply.

Advantageously, the water-gas shift reaction performed by the shift reactor 110 at step s16 tends to increase the proportion of hydrogen in the hydrogen-rich gas received by the fuel cell 112. Thus, the amount of hydrogen fuel for the fuel cell 112 tends to be increased. Thus, the fuel cell 112 tends to be able to generate more electrical power.

Furthermore, the fuel cell 112 may comprise a catalyst at either or both of its anode and cathode. For example, the fuel cell 112 may comprise a platinum catalyst at its anode that causes or facilitates the hydrogen gas to split into positive hydrogen ions and electrons. Carbon monoxide may detrimentally affect a catalyst of the fuel cell 112. The water-gas shift reaction performed by the shift reactor 110 at step s16 tends to decrease the proportion of carbon monoxide in the hydrogen-rich gas received by the fuel cell 112. Thus, a life of the fuel cell advantageously tends to be improved.

In this embodiment, a by-product of the fuel cell 112 converting the hydrogen gas into DC electricity is water, which may be in the form of water droplets dispersed within an exhaust gas (e.g. air). Typically, the exhaust gas from the fuel cell 112 including the water droplets is about 60° C. to about 80° C. (for example, about 60, 65, 70, 75 or 80° C.). In some embodiments, the water by-product of the fuel cell 112 comprises water vapour.

At step s22, the fuel cell 112 provides the generated electrical power to the electrical subsystems 114 via the electrical connection 138. The electrical subsystems 114 consume the received electrical power.

In some embodiments, one or more or the fuel store 104, the mixer 106, the fuel reformer 108, the shift reactor 110, the water extraction system 116, the cooling system 118, and the aircraft subsystems 120 are, or may include, electrically driven apparatuses or systems, which may be powered by electricity generated by the fuel cell 112. For example, the fuel reformer 108 may be an electrically driven fuel reformer powered by electrical power received from the fuel cell 112.

At step s24, the fuel cell 112 sends its exhaust gas, including the water by-product, produced at step s20 to the water extraction system 116 via the outlet of the fuel cell 112 and the eighth conduit 140. The water extraction system 116 receives the exhaust gas at its inlet.

At step s26, the water extraction system 116 extracts water from the fuel cell exhaust gas received from the fuel cell 112. Any appropriate water extraction process may be used to extract water from the fuel cell exhaust gas, for example a steam cleaning process, a steam cooling process, a process of extracting water from the exhaust gas via centrifugal force, and/or a coalescence process.

At step s28, the water extraction system 116 sends the extracted water to the cooling system 118 via the ninth conduit 142. The water sent from the water extraction system 116 to the cooling system 118 may, for example, be in the form of a liquid, or may be in the form of water droplets dispersed within a gas. The water sent from the water extraction system 116 to the cooling system 118 may have a temperature of, for example, about 60° C. to about 80° C. (for example, about 60, 65, 70, 75 or 80° C.) or less than about 60° C. (for example between 55° C. and 60° C., between 50° C. and 55° C., or between 40° C. and 50° C.). The cooling system 118 receives the water at its input.

At step s30, the cooling system 118 pumps the received water from its outlet, to the fuel cell 112 and aircraft subsystems 120 via the tenth conduit 144. At this stage, the water could be considered a water coolant.

At step s32, the water flowing through the portion of the tenth conduit 144 that passes through or proximate to the fuel cell 112 cools the fuel cell 112. In particular, relatively cool water (i.e. the water sent from the water extraction system which may have a temperature of about 60° C. to about 80° C. or less than about 60° C.) flowing through or proximate to the fuel cell 112 absorbs heat from the fuel cell 122. In this embodiment, this relatively cool water is vaporised as a result of being heated by the fuel cell 112.

The fuel cell 112 may include, or be located proximate to, a heat exchanger arranged to effect heat transfer between the fuel cell 112 and the water coolant in the tenth conduit 144.

Advantageously, the cooling of the fuel cell 112 by the water coolant flowing through the tenth conduit 144 tends to reduce or eliminate the likelihood of the fuel cell 112 overheating. Thus, damage to the fuel cell 112 caused by excessive heat tends to be reduced. Furthermore, a need for other cooling systems on the aircraft 100 may be reduced, thus reducing weight of the aircraft 100.

At step s32, the water flowing through the portion of the tenth conduit 144 that passes through or proximate to the aircraft subsystems 120 cools the aircraft subsystems 120. In particular, relatively cool water flowing through or proximate to the aircraft subsystems 120 absorbs heat from the aircraft subsystems 120. In this embodiment, this relatively cool water is vaporised as a result of being heated by the aircraft subsystems 120.

One or more of the aircraft subsystems 120 may include, or be located proximate to, a heat exchanger arranged to effect heat transfer between the aircraft subsystems 120 and the water coolant in the tenth conduit 144.

Advantageously, the cooling of the aircraft subsystems 120 (entities) by the water coolant flowing through the tenth conduit 144 tends to reduce or eliminate the likelihood of the aircraft subsystems 120 overheating. Thus, damage to the aircraft subsystems 120 caused by excessive heat tends to be reduced. Furthermore, a need for other cooling systems on the aircraft 100 may be reduced. Furthermore, the operational efficiency of one or more of the aircraft subsystems 120 may be improved as a result of the cooling.

At step s34, the cooling system 118 pumps the evaporated coolant water (i.e. steam) produced by cooling the fuel cell 112 and the aircraft subsystems 120 (at steps s30 and s32 respectively) along the tenth conduit 144. The steam produced by cooling the fuel cell 112 and the aircraft subsystems 120 may have a temperature of at least about 100° C. (at standard pressure, i.e. at nominal conditions in the atmosphere at sea level). In some embodiments, this steam may have a different temperature. For example, in some embodiments (e.g. embodiments in which the aircraft is operating at high altitude, i.e. relatively low pressure compared to atmospheric pressure at sea level), this steam may have a temperature of less than about 100° C., e.g. between 90° C. and less than 100° C., or between 80° C. and 90° C., or between 70° C. and 80° C., or less than 70° C. Also, in some embodiments, this steam may have a temperature of more than about 100° C., e.g. more than 110° C., more than 120° C., more than 130° C., more than 140° C., or more than 150° C.

In this embodiment, a proportion of the steam is pumped from the fuel cell 112 and/or the aircraft subsystems 120, along the tenth conduit 144, and then along the sixth conduit 134 to the shift reactor 110. The shift reactor 110 receives steam at its second inlet from the sixth conduit 134, as performed at step s14 above.

In this embodiment, a proportion of the steam is pumped from the fuel cell 112 and/or the aircraft subsystems 120, along the tenth conduit 144, and then along the fourth conduit 128 to the mixer 106. The mixer 106 receives steam at its second inlet from the fourth conduit 128, as performed at step s4 above.

In this embodiment, a proportion of the steam is pumped from the fuel cell 112 and/or the aircraft subsystems 120, along the tenth conduit 144 to the steam outlet 122. This steam is then expelled from the aircraft 100 via the steam outlet 122.

In some embodiments, the fourth conduit 128, the sixth conduit 134, and/or the tenth conduit 144 comprises one or more valves for controlling the flow of steam.

Thus, an embodiment of a method of operation of the electrical power generation and cooling system is provided.

The water by-product produced by the fuel cell tends to be ultra-pure, de-ionised water having little or no mineral content. Thus, advantageously, when this water is evaporated to provide cooling to the fuel cell and/or aircraft subsystems, little or no fouling of the conduits etc. occurs. In some embodiments, the water by-product produced by the fuel cell contains total dissolved solids of less than or equal to about 10 mg/litre.

Advantageously, the water by-product produced by the fuel cell is an effective coolant. The water has good heat absorption qualities and heat carrying capacity. The water coolant tends to be non-polluting, non-toxic, and non-flammable. Furthermore, the water coolant tends to be less corrosive to component parts of the system compared to conventional coolants.

Advantageously, the operating temperature of the PEM fuel cell tends to be around 60° C. to 80° C. This relatively low operating temperature tends to provide for improved safety on board the aircraft. Furthermore, this relatively low operating temperature of the fuel cell tends to provide that the water by-product produced by the fuel cell is at around 60° C. to 80° C. This relatively low water temperature advantageously tends to facilitate water extraction by the water extraction system, compared to water being at higher temperatures.

Advantageously, cooling is provided on the aircraft using a by-product of the fuel cell generating electricity (i.e. the water produced by the fuel cell). This water by-product of the fuel cell may otherwise be wasted. Furthermore, the water coolant is produced on the aircraft in operation. This tends to allow for the aircraft to carry reduced amount of other coolants or other water.

Advantageously, hydrogen fuel for the fuel cell, and water coolant for use by the cooling system, is produced on the aircraft from the aircraft jet fuel. Thus, use of additional stores of hydrogen fuel and/or water coolant on the aircraft, and associated distribution systems and supply lines, tend to be avoided. This tends to reduce aircraft weight. Furthermore, aircraft refuelling tends to be facilitated, as only a single type of consumable fuel (i.e. jet fuel) is used by the aircraft. This tends to be particularly advantageous in embodiments in which the aircraft is refuelled via air-to-air refuelling.

The mixer, fuel reformer, and shift reactor advantageously tend to recover hydrogen from the water by-product of the fuel cell. In other words, the mixer, fuel reformer, and shift reactor advantageously tend to recover hydrogen previously used by the fuel cell.

The shift reactor advantageously tends to reduce the carbon monoxide content of the output of the fuel reformer. Thus, carbon monoxide content of the hydrogen fuel supply to the fuel cell tends to be reduced. This tends to result in improved life of the fuel cell. Furthermore, carbon monoxide emission of the aircraft may be reduced.

Conventionally, many aircraft comprise engine driven electrical power generation systems. For example, a conventional aircraft may include one or more turbine based auxiliary power units (APUs). Conventional aircraft may comprise electricity generators that are driven by bleed air extracted from the aircraft engines. In contrast, in the above described embodiments, the aircraft does not include any engine driven electrical power generation systems and the engine does not generate any electrical power on the aircraft. Instead, all electrical power on the aircraft is generated by the fuel cell, i.e. the fuel cell satisfies all electrical loads on the aircraft. In some embodiments, one or more batteries and/or other power storage or generation devices may be implemented on the aircraft to provide electrical power, for example in addition to the fuel cell. Advantageously, the fuel cell tends to provide more efficient electricity generation compared to an engine driven electrical power generator. For example, the fuel cell may be at least 50%±5% efficient at electricity generation, while a conventional gearbox driven electrical power generator may be ~18% efficient at electricity generation. Furthermore, by avoiding use of an engine driven electrical power generator, it tends to be possible to omit the engine driven electrical power generator and associated apparatus (such as an engine radial shaft, gearboxes, and secondary power sources) from the aircraft, thereby reducing aircraft weight. Furthermore, by avoiding use of an engine driven electrical power generator, fuel usage by the aircraft engine tends to be reduced, thus allowing the aircraft to carry less fuel, thereby reducing aircraft weight. Furthermore, the fuel cell generating substantially all electrical power on the aircraft tends to provide that the fuel cell produces, as a by-product of generating the electrical power, a sufficient amount of water for the cooling system to provide effective cooling.

In the above embodiments, the electrical power generation and cooling system is implemented on a manned aircraft. However, in other embodiments, the electrical power generation and cooling system is implemented on a different entity. For example, the electrical power generation and cooling system may be implemented on an unmanned air vehicle, a land-based vehicle, a water-based vehicle, or in a building.

In the above embodiments, the engine is a gas turbine engine. However, in other embodiments, the engine is a different type of engine. In the above embodiments, the aircraft fuel is jet fuel comprising kerosene and/or naphtha. However, in other embodiments the aircraft fuel is a different type of fuel for the engine, for example a jet biofuel. Generally, the fuel may be any type of hydrocarbon-based fuel, for example fuel that comprises $C_{6-16}$ hydrocarbons.

In the above embodiments, the fuel reformer is a plasma fuel reformer. However, in other embodiments the fuel reformer is a different type of fuel reformer such as a plasmatron fuel reformer.

In the above embodiments, the shift reactor is a water-gas shift reactor. However, in other embodiments the shift reactor is a different type of shift reactor.

In the above embodiments, the fuel cell is a PEM fuel cell. However, in other embodiments the fuel cell is a different type of fuel cell other than a PEM fuel cell. For example, in some embodiments the fuel cell is a fuel cell, such as a solid oxide fuel cell, that tends not to be significantly detrimentally effected by the presence of carbon monoxide in the fuel cell fuel.

In the above embodiments, the electrical power generation and cooling system comprises a shift reactor to reduce carbon monoxide content in the fuel reformer output. However, in other embodiments the shift reactor is omitted. In some embodiments, the electrical power generation and cooling system comprises a separator (e.g. a chemical separator, or carbon monoxide scrubber) instead of or in addition to the shift reactor. The separator may be configured to process the fuel reformer output and separate hydrogen gas from carbon monoxide. The separator may be considered a carbon monoxide reduction module. The separator may be arranged to send the separated hydrogen gas to the fuel cell, and to prevent or oppose the separated carbon monoxide being sent to the fuel cell.

In some embodiments, the electrical power generation and cooling system further comprises one or more coolers to cool the water output by the fuel cell prior to that water being received by the cooling system. For example, a pre-cooler may be arranged between the fuel cell and the water extractor to cool the water received by the water extractor. This may facilitate extraction of water by the water extractor.

In the above embodiments, unused steam is expelled from the steam outlet of the aircraft. However, in other embodiments, no steam is expelled from the aircraft, and substantially all water produced by the fuel cell is used and/or retained on the aircraft.

In the above embodiments, the mixer mixes steam with the aircraft fuel to vaporise the aircraft fuel. However, in other embodiments the aircraft fuel is vaporised in a different way, i.e. other than by using steam. In some embodiments, the mixer is omitted.

In the above embodiments, the mixer receives steam from the cooling system, the steam being produced by the coolant water being evaporated when cooling the fuel cell and/or the aircraft subsystems. However, in other embodiments the mixer receives steam from a different source on the aircraft.

In the above embodiments, the shift reactor reacts steam with the fuel reformer output. However, in other embodiments the shift reactor receives and utilises water in a different state, e.g. in liquid form, instead of or in addition to steam.

In the above embodiments, the shift reactor receives steam from the cooling system, the steam being produced by the coolant water being evaporated when cooling the fuel cell and/or the aircraft subsystems. However, in other embodiments the shift reactor receives steam from a different source on the aircraft.

In the above embodiments, the electrical power generation and cooling system comprises a water extractor and a cooling system. However, in other embodiments, one or both of the water extractor and the cooling system is omitted. For example, in some embodiments, water produced by the fuel cell is not used for cooling. The water produced by the fuel cell may be used in a different way on the aircraft (e.g. stored, or used as drinking water for people on board the aircraft), or may be expelled from the aircraft.

In the above embodiments, the one or more entities to which the cooled water is provided are one or more aircraft subsystems. However, in other embodiments, the one or more entities may be subsystems in a land-based vehicle, a water-based vehicle, or in a building.

In the above embodiments, the engine does not generate any electrical power on the aircraft. However, in other embodiments, the aircraft includes one or more engine driven electrical power generation systems.

What is claimed is:

1. A vehicle comprising:
a fuel store configured to store a fuel, the fuel comprising a hydrocarbon;
a fuel reformer coupled to the fuel store and configured to:
receive an input comprising the hydrocarbon; and
process the received input to produce an output comprising hydrogen;
a fuel cell coupled to the fuel reformer and configured to:
receive the hydrogen from the fuel reformer;
produce, using the received hydrogen, electricity for use on the vehicle; and
produce, as a result of producing the electricity, a fuel cell output comprising water;
a cooling system configured to:
receive and cool the water produced by the fuel cell; and
provide the water as a coolant to the fuel cell and to one or more vehicle subsystems, thereby cooling the fuel cell and the one or more vehicle subsystems; and
at least one of:
a mixer configured to receive the fuel from the fuel store, receive steam, mix the received fuel and the received steam, thereby to produce a mixture, and provide the mixture to the fuel reformer as the fuel reformer input; and
a shift reactor configured to receive the output of the fuel reformer, receive steam, process the received output of the fuel reformer and the received steam, thereby to produce an output of the shift reactor, wherein a hydrogen content of the output of the shift reactor is greater than a hydrogen content of the output of the fuel reformer, and provide the output of the shift reactor to the fuel cell;
wherein the steam that is received by at least one of the mixer and the shift reactor is produced by evaporation of the water during the cooling by the water of at least one of the fuel cell and the one or more vehicle subsystems.

2. The vehicle according to claim 1, wherein the fuel reformer is an electrically driven fuel reformer powered by the electricity produced by the fuel cell.

3. The vehicle according to claim 1, further comprising an engine coupled to the fuel store, wherein the engine is configured to combust the fuel to generate thrust for the vehicle.

4. The vehicle according to claim 1, wherein the vehicle is an aircraft and the fuel is an aviation fuel.

5. The vehicle according to claim 1, wherein the at least one of a mixer and a shift reactor includes a mixer configured to:
receive the fuel from the fuel store;
receive the steam produced by evaporation of the water during the cooling by the water of at least one of the fuel cell and the one or more vehicle subsystems;
mix the received fuel and the received steam, thereby to produce a mixture; and
provide the mixture to the fuel reformer as the fuel reformer input.

6. The vehicle according to claim 1, wherein the at least one of a mixer and a shift reactor includes a shift reactor configured to:
receive the output of the fuel reformer;
receive the steam produced by evaporation of the water during the cooling by the water of at least one of the fuel cell and the one or more vehicle subsystems;
process the received output of the fuel reformer and the received steam, thereby to produce an output of the shift reactor, wherein a hydrogen content of the output of the shift reactor is greater than a hydrogen content of the output of the fuel reformer; and
provide the output of the shift reactor to the fuel cell.

7. The vehicle according to claim 6, wherein the shift reactor is a water-gas shift reactor.

8. The vehicle according to claim 1, further comprising:
a carbon monoxide reduction module configured to:
receive the output of the fuel reformer;
reduce a carbon monoxide content of the received output of the fuel reformer, thereby to produce an output of the carbon monoxide reduction module; and
provide the output of the carbon monoxide reduction module to the fuel cell.

9. The vehicle according to claim 1, further comprising a water extraction system configured to:
receive the fuel cell output;
extract the water from the fuel cell output; and
provide the extracted water to the one or more entities remote from the fuel cell.

10. The vehicle according to claim 1, wherein the fuel reformer is a plasma fuel reformer or a plasmatron fuel reformer.

11. A method of generating electricity on a vehicle, the method comprising:
storing, by a fuel store on the vehicle, a fuel comprising a hydrocarbon;
receiving, by a fuel reformer on the vehicle, an input comprising the hydrocarbon;
processing, by the fuel reformer, the received input to produce an output comprising hydrogen;
receiving, by a fuel cell on the vehicle, the hydrogen output by the fuel reformer;
producing, by the fuel cell, using the received hydrogen, electricity for use on the vehicle;
producing, by the fuel cell, as a result of producing the electricity, a fuel cell output comprising water;
receiving and cooling by a cooling system of the water produced by the fuel cell;
providing the water as a coolant to the fuel cell and to one or more vehicle subsystems, thereby cooling the fuel cell and the one or more vehicle subsystems; and
at least one of:
receiving by a mixer of steam and of the fuel from the fuel store, mixing by the mixer of the received steam and the received fuel, thereby producing a mixture, and providing the mixture to the fuel reformer as the fuel reformer input; and
receiving by a shift reactor of steam and of the output of the fuel reformer, processing the received output of the fuel reformer and the received steam, thereby producing an output of the shift reactor, wherein a hydrogen content of the output of the shift reactor is greater than a hydrogen content of the output of the fuel reformer, and providing the output of the shift reactor to the fuel cell;
wherein the steam that is received by at least one of the mixer and the shift reactor is produced by evaporation of the water during the cooling by the water of at least one of the fuel cell and the one or more vehicle subsystems.

* * * * *